J. A. YOUNG & G. YOUNG, Jr.
GLASS LENS.
APPLICATION FILED SEPT. 28, 1911.
1,025,774.
Patented May 7, 1912.
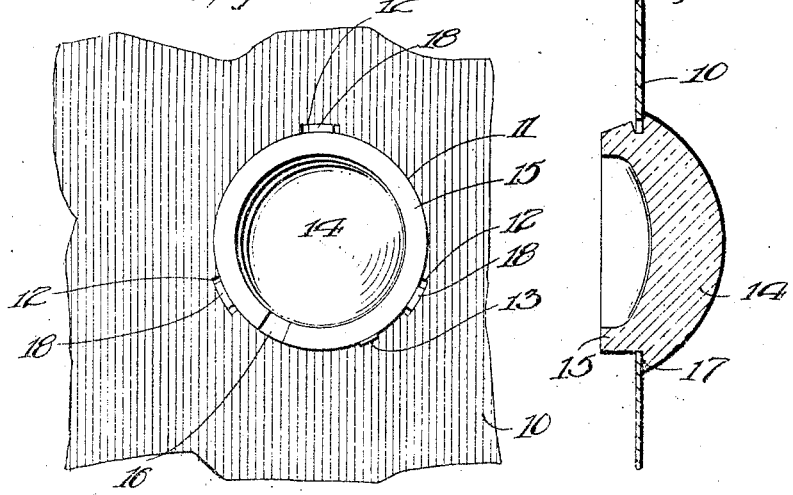
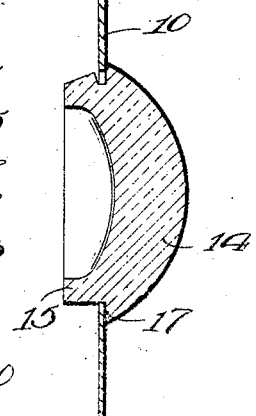
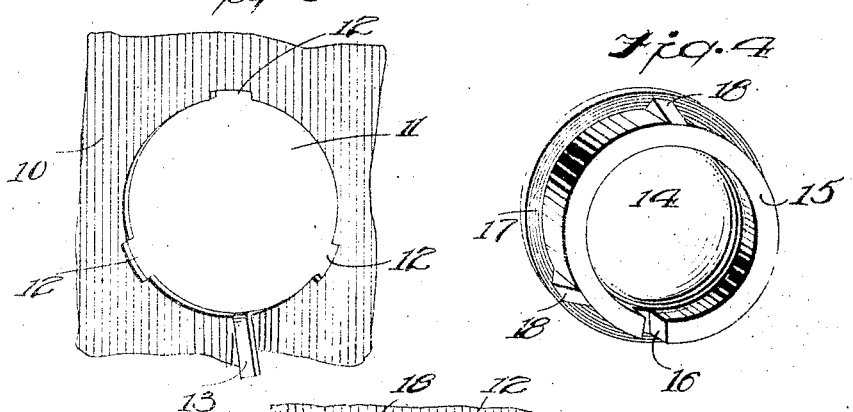
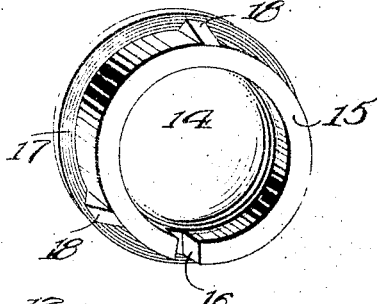
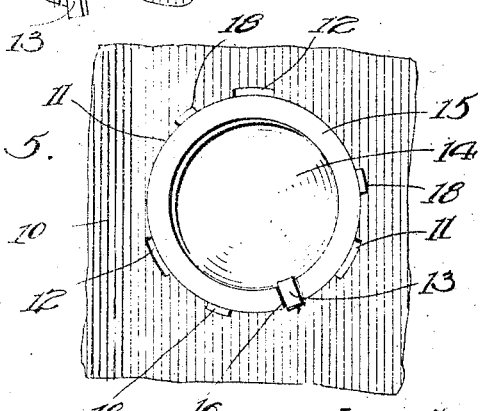
WITNESSES
INVENTORS
Joseph A. Young
George Young Jr.

UNITED STATES PATENT OFFICE.

JOSEPH ALBERT YOUNG AND GEORGE YOUNG, JR., OF BELLEVUE, IOWA.

GLASS LENS.

1,025,774.      Specification of Letters Patent.      Patented May 7, 1912.

Application filed September 28, 1911. Serial No. 651,881.

*To all whom it may concern:*

Be it known that we, JOSEPH ALBERT YOUNG and GEORGE YOUNG, Jr., citizens of the United States, residing at Bellevue, in the county of Jackson and State of Iowa, have invented certain new and useful Improvements in Glass Lenses, of which the following is a specification, reference being had therein to the accompanying drawing.

This invention relates to signs and has special reference to that type of illuminating signs wherein the casing is provided with a number of openings arranged to suit the design and lenses are held in these openings to be illuminated by a suitable electric or other light placed within the casing.

The principal object of the invention is the provision of an improved means of preventing the rotation of the lens within the opening.

With the above and other objects in view as will be hereinafter apparent, the invention consists in general of certain novel details of construction, combinations of elements and arrangements of parts hereinafter fully described and illustrated in the accompanying drawing and specifically claimed.

In the accompanying drawing, like characters of reference indicate like parts in the several views, and:—Figure 1 is a view from the rear of a lens showing it in position in a casing, the view illustrating the position of the lens at the moment of its insertion. Fig. 2 is a vertical median section through the lens shown in Fig. 1. Fig. 3 is a view of the casing prior to the insertion of the lens, the locking tongue being bent back. Fig. 4 is a perspective view of the lens removed from the casing. Fig. 5 is a view of the lens and a portion of the casing showing the lens locked in position.

For the purpose of illustrating the device there has been shown in the present case a single lens and a small portion of one wall of the casing. It will be obvious, however, that the lens may be of other shapes or arrangements and that the lenses will be arranged in some particular order on the casing according to the design of the sign to be constructed.

The casing is indicated at 10 and this casing is provided with one or more openings 11, which are circular in general form but which have spaced notches 12 extending into the body of the metal of which the casing is formed. When the metal is stamped to provide the openings 11, a tongue 13 is left extending inward toward the center of the opening. In the formation of the sign this tongue is afterward bent back for the purpose of leaving the opening 11 clear. In the present instance, a single tongue 13 is shown, but it will of course be obvious that several of these tongues may be employed if it were deemed necessary on account of the size of the lens or other reason. The lens to be used in connection with this device is provided with a body portion 14, preferably concavo-convex and having a rearwardly projecting annular rib 15. This rib is provided with one or more notches 16, in accordance with the number of the tongues 13 in the respective openings of the casing. Furthermore, the rib 15 is so arranged that an annular shoulder 17 is formed exterior of this rib. Projecting from the rib 15 are a series of spaced lugs 18 which are equal in number to the notches 12 and similarly spaced. These lugs 18 have their other ends in spaced relation to the shoulder 17 so that the casing 10 may be engaged between the lugs and this shoulder, thus holding the lens in place.

When it is desired to build up a sign with these lenses a suitable design is formed by stamping a series of openings through the metal and the tongues 13 are bent back out of the openings 11, the lenses are then inserted in such a manner that the lugs 18 will pass through the notches 12 after which each of the lens is rotated to the position shown in Fig. 5 so that the lugs 18 will engage over the edge of the opening 11, the respective tongue 13 is then bent down into the notch 16, thereby preventing the respective lens from accidentally rotating to the position of entry of the lugs 18 in the notches 12, and thus be in danger of dropping out. It will be noted that by reason of the beveling of the lugs 18 in the event that the fit of the lens in the middle is too tight, the beveled surface of the respective lugs will force the metal to bend somewhat and permit the passage of the lens into position. There has thus been provided a simple and efficient device of the kind described and for the purpose specified.

It is obvious that many minor changes may be made in the form and construction of this invention without departing from the material principles thereof. It is not therefore desired to confine the invention to the exact form herein shown or described, but it is wished to include all such as properly come within the scope of the appended claim.

Having thus described the invention, what is claimed as new is:—

The combination with a display lens having an annular rib on its rear portion, said rib being provided with a notch and a plurality of projecting beveled lugs; of a holder for said lens comprising a plate having a circular opening therein and a plurality of notches leading therefrom, and a tongue between two of the notches adapted to be engaged in the notch of the lens.

In testimony whereof we hereunto affix our signatures in presence of two witnesses.

JOSEPH ALBERT YOUNG.
GEORGE YOUNG, Jr.

Witnesses:
J. C. CAMPBELL,
LUCILE CAMPBELL.